United States Patent [19]

Hawkins

[11] Patent Number: 4,807,716
[45] Date of Patent: Feb. 28, 1989

[54] MOTORIZED CARRYING CART AND METHOD FOR TRANSPORTING

[76] Inventor: J. F. Hawkins, 3120 W. 16th, Wichita, Kans. 67203

[21] Appl. No.: 12,277

[22] Filed: Feb. 9, 1987

[51] Int. Cl.⁴ ............................................... B60K 1/00
[52] U.S. Cl. .................................. 180/65.1; 180/65.6; 280/655; 280/47.371
[58] Field of Search ........................... 180/65.6, 65.1; 280/655, 47.37 R

[56] References Cited

U.S. PATENT DOCUMENTS

| | | | |
|---|---|---|---|
| 2,918,133 | 12/1959 | Ericsson | 180/19.1 |
| 3,266,813 | 8/1966 | Bosko et al. | 280/47.11 |
| 3,485,314 | 12/1969 | Herr | 180/19.1 |
| 3,791,470 | 2/1974 | Baddore et al. | 180/19.1 |
| 3,952,822 | 4/1976 | Udden et al. | 180/65.6 |
| 4,137,984 | 2/1979 | Jennings et al. | 180/19.1 |
| 4,203,609 | 5/1980 | Mitchell et al. | 280/47.11 |
| 4,655,466 | 4/1987 | Hanaoka | 280/47.37 R |

*Primary Examiner*—Kenneth R. Rice
*Attorney, Agent, or Firm*—John Wade Carpenter

[57] ABSTRACT

A motorized carrying cart having a pan bracket, and a plurality of wheels for supporting the carrying cart. A battery is positioned in a battery recess of the pan bracket. A pair of upright brackets is secured to the pan bracket. A handle support bar extends through and protrudes from an aperture of each of the brackets, and a handle latch is pivotally secured at its respective ends to the pair of upright brackets and is biased upwardly towards the handle support bar by a pair of springs secured between each end of the handle support bar and the end section of the handle lathe. A pair of motors engage a pair of upper sprockets that are engaged to a lower sprocket through an endless chain. A U-shaped handle is pivotally secured to the handle support bar. An electronic circuitry is electrically engaged between the battery and each of the drive motors. A method for transporting articles, or the like, with a motor cart whose handle may be pivoted forward such that a pinpoint roller can receive rotary power take-off from the pair of front wheels that are being rotated from the cart being propelled by a drive motor.

15 Claims, 8 Drawing Sheets

MOTORIZED CARRYING CART AND METHOD FOR TRANSPORTING

BACKGROUND OF THE INVENTION

1. Field of the Invention

This invention is related to a battery operated, motorized carrying cart. More specifically, this invention provides a battery operated, motorized carrying cart and a method for transporting garbage cans, or the like.

2. Description of the Prior Art

U.S. Pat. No. 2,918,133 by Ericsson teaches a powered barrow or cart adapted for the handling and transportation of diverse materials. U.S. Pat. No. 3,266,813 to Bosko et al. discloses a mobile garden and refuse cart for safe, sanitary storage and sanitary cleanup or pickup service. U.S. Pat. No. 3,485,314 to Herr teaches an article carrying land vehicle with a cargo container and with an optional stowable riding attachment. U.S. Pat. No. 3,791,470 by Baddorf et al. discloses a motorized wheelbarrow. U.S. Pat. No. 4,137,984 to Jennings et al. provides an automatic, self guiding transporter having electrically driven wheels activated by a control mechanism which senses the magnetic field around a buried guide wire. U.S. Pat. No. 4,203,609 by Mitchell et al. teaches a transport cart of the type used in industrial-commercial applications for movement of articles, preferably those loaded on pallets. None of the foregoing prior art teach or suggest the particular transport cart, or method for transporting, of this invention.

SUMMARY OF THE INVENTION

It is therefore an object of the present invention to provide a motorized carrying cart;

It is another object of the present invention to provide a motorized carrying cart that is relatively economical to manufacture.

Still other objects will be apparent to those skilled in the art from the following description of the invention.

The foregoing objects are achieved according to the practice of this invention. Broadly, the invention comprises a motorized carrying cart having a pan bracket means with a structure defining a lateral slot, a battery recess, and a pair of fenders with each fender having a fender slot. A pair of front wheels and a pair of rear wheels rotatably supporting the pan bracket; and a battery is positioned in the battery recess to be supported by the pan bracket. A pair of upright bracket means is secured to the pan bracket means, each of said bracket means has a structure defining a first aperture, a second aperture, a plurality of third apertures with the majority of said third apertures being substantially oblong in shape and not circular, and a fourth aperture. The pair of upright bracket means are each structurally deformed such as to define a stop means. A handle support bar with a pair of support ends extends through and protrudes from the first apertures of each of the bracket means. The motorized carrying cart additionally comprises a handle latch means whose uppermost portion is generally horizontal with a horizontal plane and whose end sections are deformed such that each end section extends downwardly from the horizontal uppermost portion, then horizontally over to and past a bracket means and across the outside facial surface of a bracket means, and subsequently through the second apertures of each of the bracket means such that the handle latch means has an end pivotally secured to one of the pair of bracket means. A pair of spring means extends from each end of the handle support bar to each end section of the handle latch means that extends across and/or protrudes away from the outside facial surface of the bracket means for biasing the handle latch means upwardly towards the handle support bar. The motorized cart additionally comprises a pair of motor drive means mounted to the pair of bracket means through the plurality of third apertures. An axle extends laterally across the motorized carrying cart with its respective ends extending through the fourth aperture of each bracket means. The rear wheels are rotatably secured to the ends of the axle, and a pair of upper sprocket means is directly engaged to the pair of motor means on the opposite side of each of the bracket means. A pair of lower sprocket means is secured to the axle between each of the bracket means and each rear wheel; and a pair of endless chains engage each of the upper sprocket means and each of the lower sprocket means. In order to guide the motorized cart in a desired direction, a generally U-shaped handle means is pivotally secured to the handle support bar such that respective end section of the U-shaped handle rests on the respective end sections of the handle latch means to be biased upwardly with the respective stop means on the pair of bracket means engaging the end section of handle means above the handle support bar to prevent he handle from rotating past the stop means on each of the bracket means. A reinforcement bracket means is secured underneath the front of said pan bracket means, and the pair of first wheel means is connected to the reinforcement bracket means. The motorized cart of this invention additionally comprises a circuitry means electrically engaged between the battery and each of the drive motor means for conducting power from the battery to the drive motor means. The motorized cart is provided with a cover having a pair of cover apertures that slidably receive the U-shaped handle. The front part of the cover has a front edge that is slidably disposed in the lateral slot of the pan bracket, and a rear part that has a rear edge which is slidably disposed in the fender slots of the pan bracket.

DETAILED DESCRIPTION OF THE INVENTION

Referring in detail now to the drawings wherein similar parts of the invention are identified by like reference numerals, there is seen the motorized carrying cart, generally illustrated as 10, having a pan bracket 12 that includes a lateral slot 14. The pan bracket 12 also has a structure defining a battery recess 16 wherein a battery 18 rests and is the power source for the motorized carrying cart 10. The structure of the pan bracket 12 is continuous such as to define a pair of rear fenders 19—19. Each of the rear fenders 19 has a rear fender slot 21.

A plurality of wheels 20 is provided to support the pan bracket 12, and enables the motorized carrying cart 10 to readily travel over a ground surface 2, or the like. In a preferred embodiment of the invention, the plurality of wheels 20 comprises a pair of front wheels 20F—20F and a pair of rear wheels 20R—20R. The pair of front wheels 20F—20F are included within a pair of caster means, generally illustrated as 22. The pair of caster means 22—22 is bound to a reinforcement bracket 23 that is positioned between the pair of caster means 22—22 and the pan bracket 12. Caster means 22—22 are typical casters which are rotatable over 360°. Corrugated reinforcement means 25 is superimposed on top of the front of the pan bracket 12 and defines a plurality of ribs 27 whereupon garbage cans, trash bags, or the like, may be supported and transported by the carrying cart 10. The rear wheels 20R—20R are rotatably supported by a rear axle 24 that extends through a pair of rear brackets, each generally illustrated as 26.

Each rear bracket 26 has an aperture 28 wherethrough a handle support bar 29 passes and is held in place by a pair of nuts 30—30. Each bracket 26 is structurally deformed to define a stop member 32 which is essentially normal to the main structure of the bracket 26. Each rear bracket 26 has an aperture 34 wherethrough an end of a handle latch 36 pivotally lodges. A spring 38 is interconnected between the bottom of the handle latch 36 and the end of the handle support bar 29 for biasing the handle latch 36 upwardly towards the handle support bar 29. A generally U-shaped handle 40 is rotatably supported by the handle support bar 29. Stop member 32 prevents handle 40 from rotating backwardly while the bottom of handle latch 36 prevents the handle 40 from rotating forward.

At the bottom of each bracket 26 is an aperture 42 wherethrough the rear axle 24 is rotatably supported. A plurality of apertures, generally illustrated as 44, is disposed at approximately the center of each of the brackets 26 with three of these apertures 44 being oblique in configuration. More specifically, apertures 44A, 44B, and 44C are generally oblong in shape with aperture 44D being circular. The plurality of apertures 44 on each bracket 26 is for receiving an upper sprocket member 46. Each upper sprocket member 46 on each bracket 26 makes a direct drive connection with a drive motor. Each drive motor is preferably a permanent magnet right angle drive motor and is generally illustrated as 48. Each drive motor 48 provides rotary power to its respective upper sprocket member 46. A lower sprocket member 50 is bound in proximity to each of the ends of the axle 24, and is imparted with rotary power by an endless chain 52 that transfers rotary power from the rotating upper sprocket member 46. On each end of the axle 24 is a hub spacer and drive means, generally illustrated as 54, which are bound to each end of the axle 24 and to the wheels 20R—20R and transfer rotary power from the rotating axle 24 to the wheels 20R—20R. A cover 56 encloses the battery 18, brackets 26—26, the handle support bar 29, the handle latch 36, the springs 38—38, and the pair of drive motor means 48—48. The cover 56 is provided with a pair of cover apertures 58—58 wherethrough the generally U-shaped handle slidably passes. The front part of the cover 56 slidably lodges within the lateral slot 14 of the pan bracket 12, and the rear part of the cover is slidably disposed within the rear fender slots 21.

Figures 9, 10:
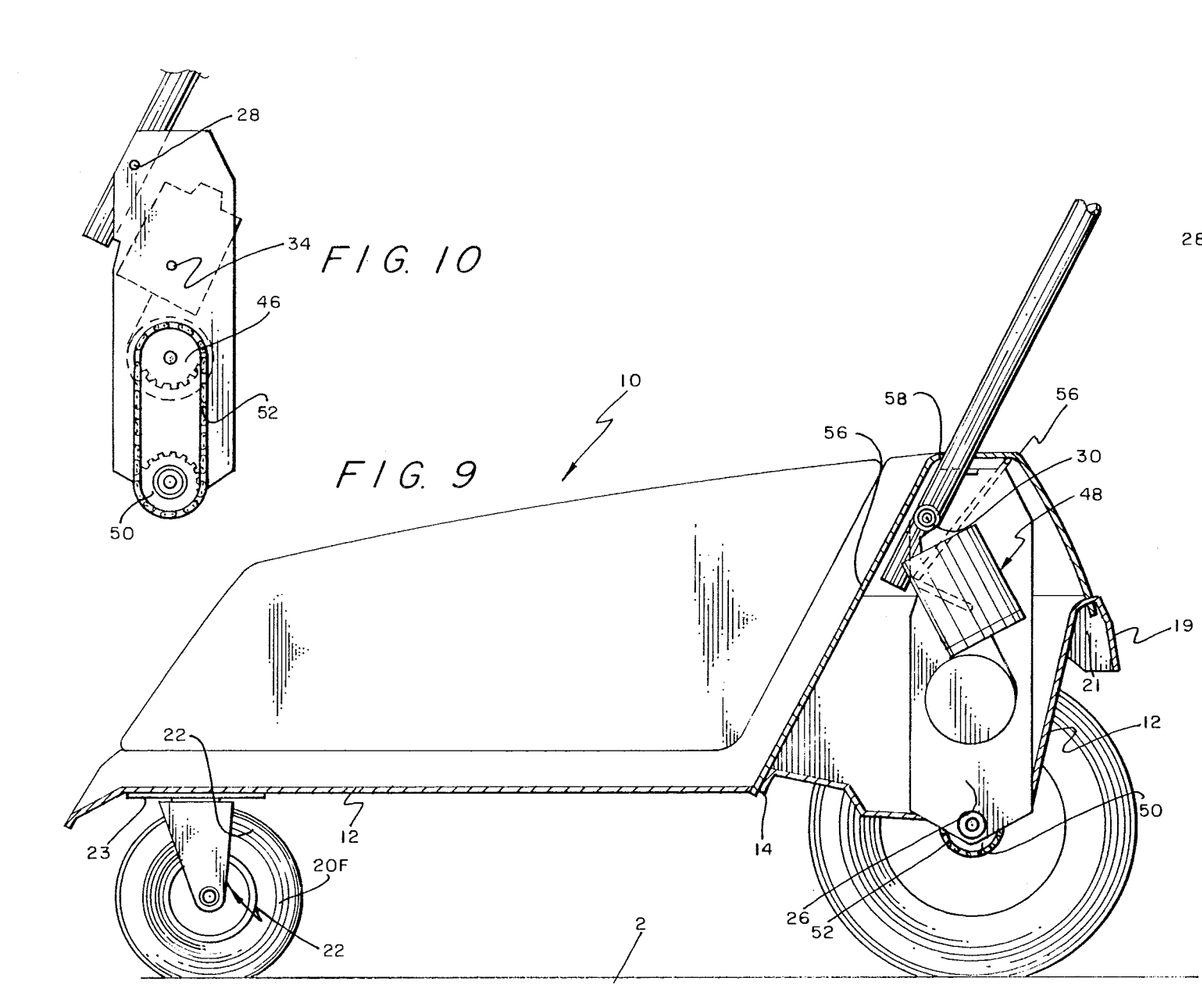
FIG. 9 is a vertical sectional view through the motor cart disclosing the main pan bracket supported by a pair of front wheels and a pair of rear wheels and a cover that has a cover aperture wherethrough the handle passes and wherein the cover is slidably positioned into a slot within the pan bracket and a fender slot.
FIG. 10 is a partial side elevational view disclosing the bracket with motor and drive assembly.
Figure 11:
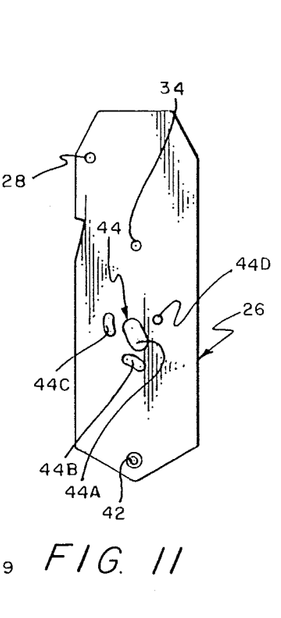
FIG. 11 is a side elevational view of the bracket.
Figures 12, 13:
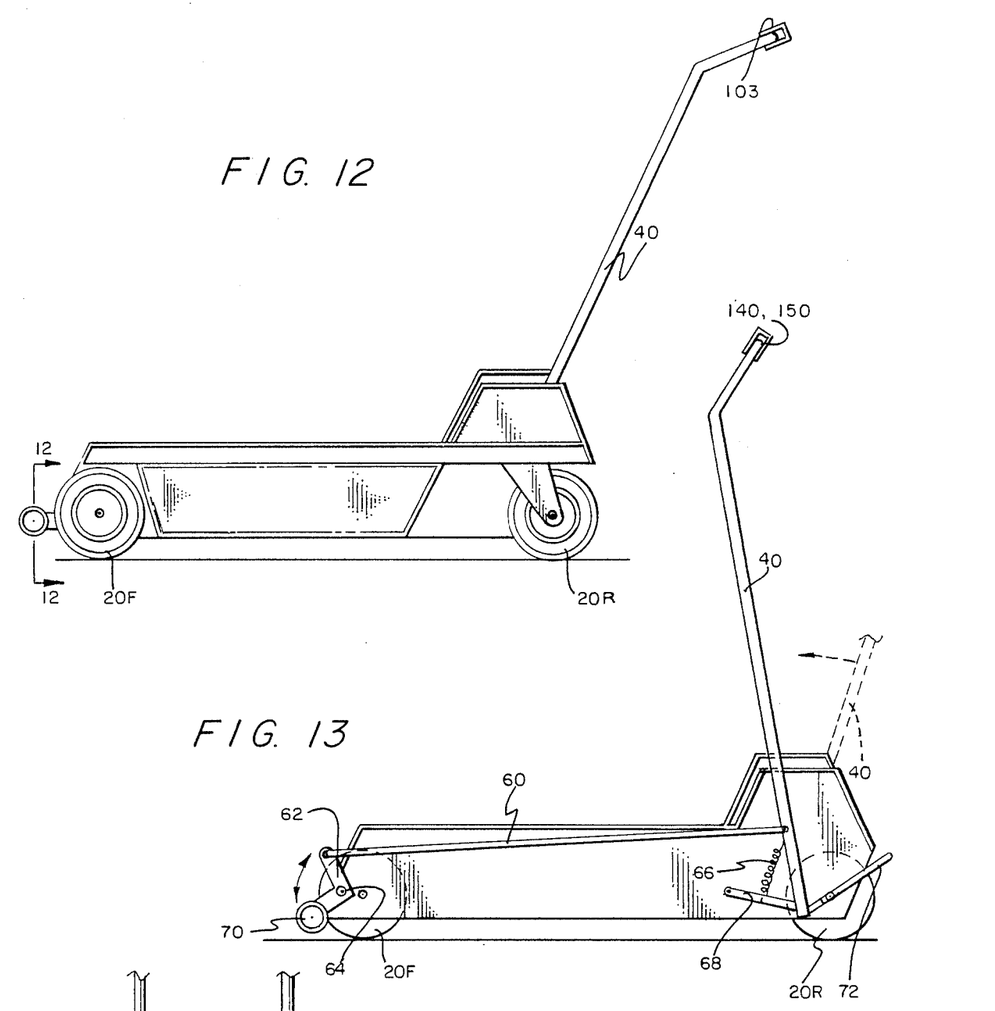
FIG. 12 is a side elevational view of another embodiment of the motor cart having a pin-point roller.
FIG. 13 is a partial vertical sectional view of the embodiment of the motor cart of FIG. 12 disclosing the pin-point roller engaged to the pair of front wheels.
Figure 14:
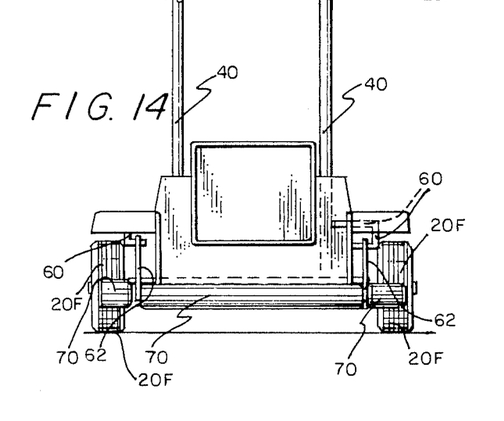
FIG. 14 is a partial back elevational view of the motor cart of FIG. 12.
Figure 15:
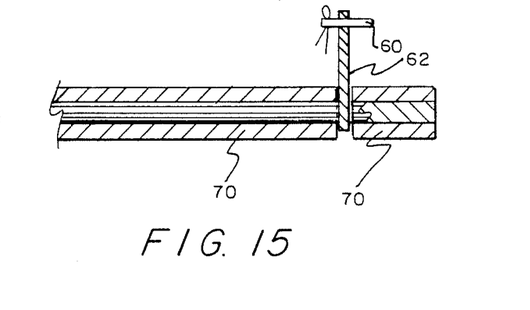
FIG. 15 is a partial sectional view of the pin-point roller and the end of the linkage bar that engages the pin-point roller.
Figure 16:
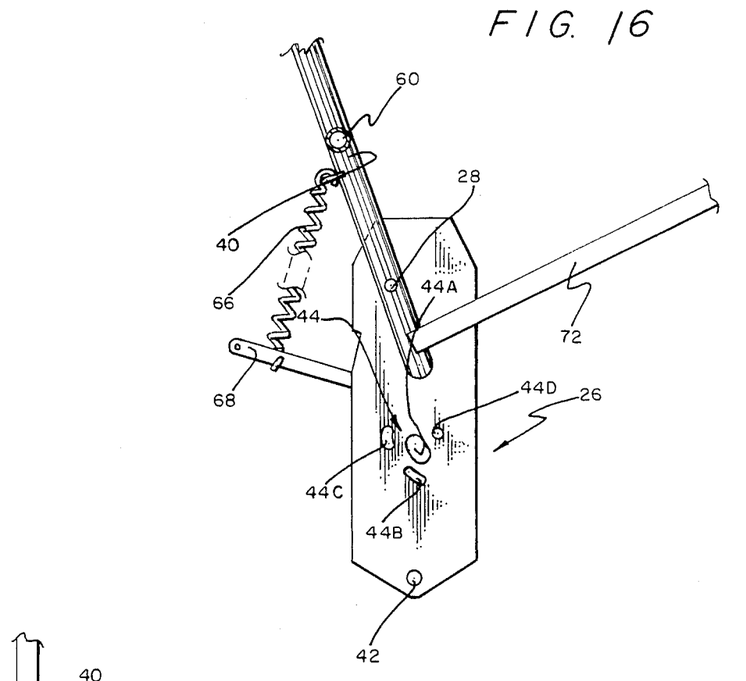
FIG. 16 is a partial side view of the bracket for the embodiment of the motor cart in FIG. 12 with the handle pivoted to the bracket and interconnected to a spring bar through a spring and a foot bar 72, and wherein a foot bar 72 is integrally bound to the handle.
Figure 17:
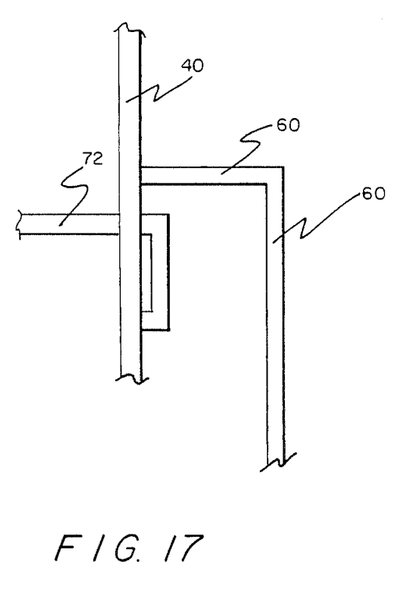
FIG. 17 is a partial top plan view disclosing the handle bound to the foot bar and to the linkage.
Figure 18:
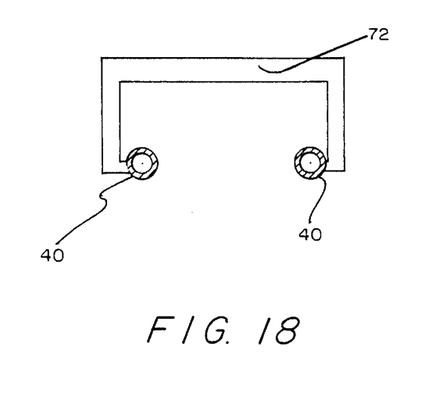
FIG. 18 is a top plan view of the foot bar bound to the handle.

In another embodiment of the invention (see FIGS. 9-12), the handle latch 36, the springs 38—38, and the handle support bar 29 are all omitted, and are replaced by a pair of linkage bars 60—60 that are pivotally connected to the handle 40 and to a pair of generally L-shaped load assist bars 62—62. All of the remaining features (i.e. brackets 26—26, drive motors 48—48, etc.) of the invention remain with the exception that each bracket 26 does not have aperture 34. Each of the load assist bars 62 is pivotally connected to the pan bracket 12 at 64. The handle 40 is consistently being biased downwardly by a pair of spring means 66—66 that interconnect the lower part of the U-shaped handle 40 with a pair of spring bars 68—68 that are rigidly or stationarily affixed to the pair of brackets 26—26. A generally U-shaped foot bar 72 is integrally bound to the lower part of the handle 40 such as to be able to return the handle 40 to the position of FIG. 9 (or the dotted line portion of FIG. 10) when being stepped on. A pin point roller 70 is rotatably secured to the L-shaped load assist bar 62 such that when the assist bar 62 is pivoted forward at 64 by the linkage bars 60—60 being moved forward by handle 40 being moved forward by the user, the pinpoint roller 70 frictionally engages the pair of front wheels 20F—20F, which for this embodiment is not contained within casters 22—22. In this embodiment of the invention casters 22—22 are positioned in the rear and contain the rear wheels 20R—20R.

Figure 1:
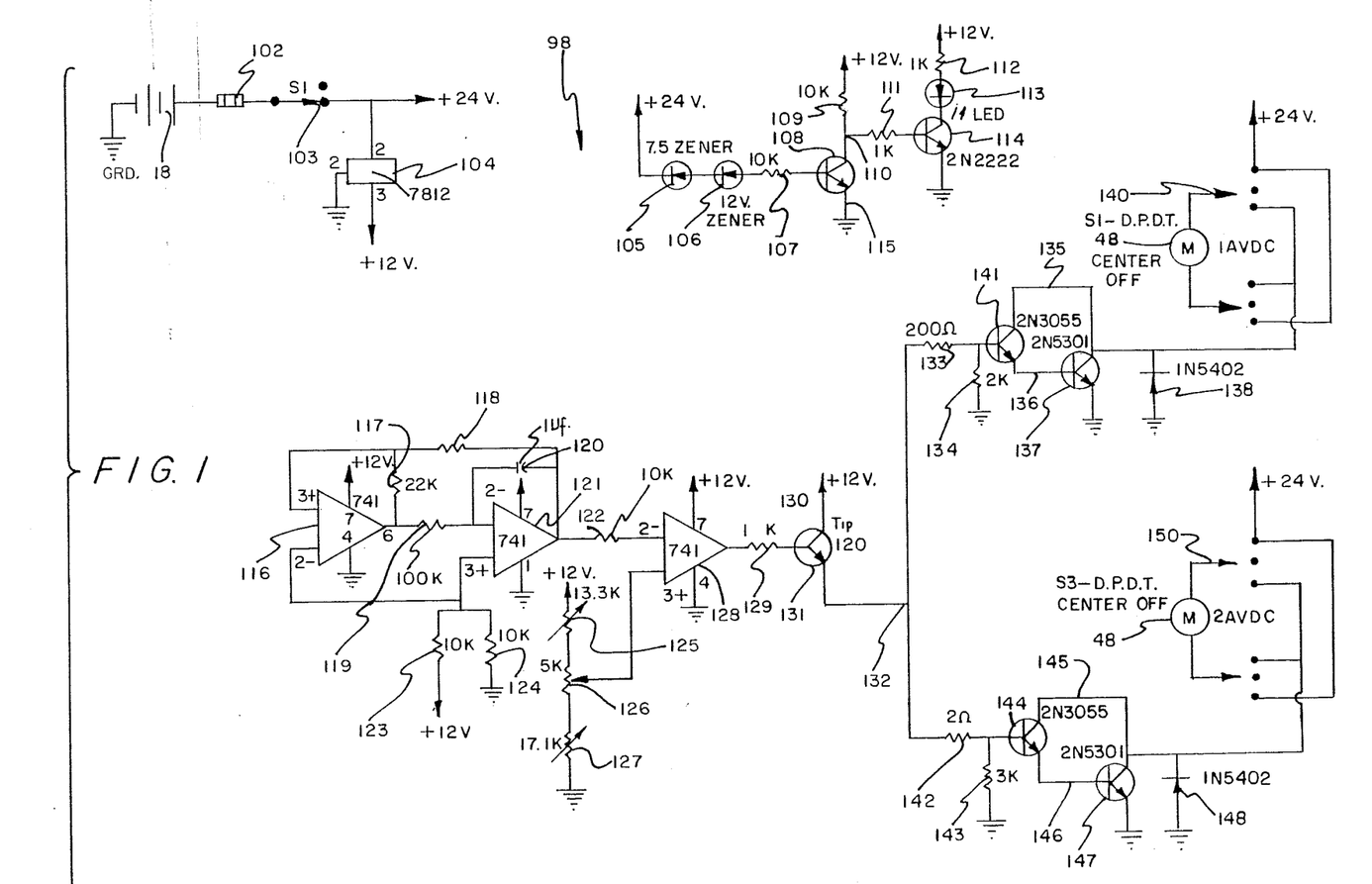
FIG. 1 is a schematic electrical circuit diagram for the electrical circuitry of this invention.
Figure 2:
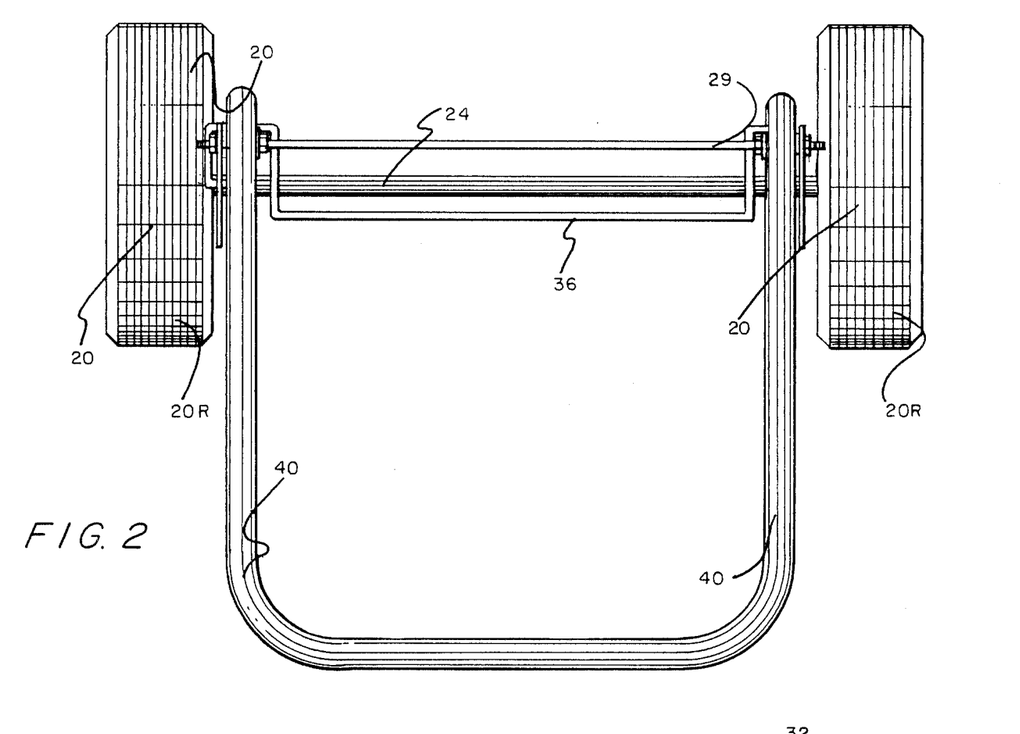
FIG. 2 is a partial top plan view of the motorized cart disclosing the handle support bar, the handle latch, and the axle for the rear wheel.
Figure 3:
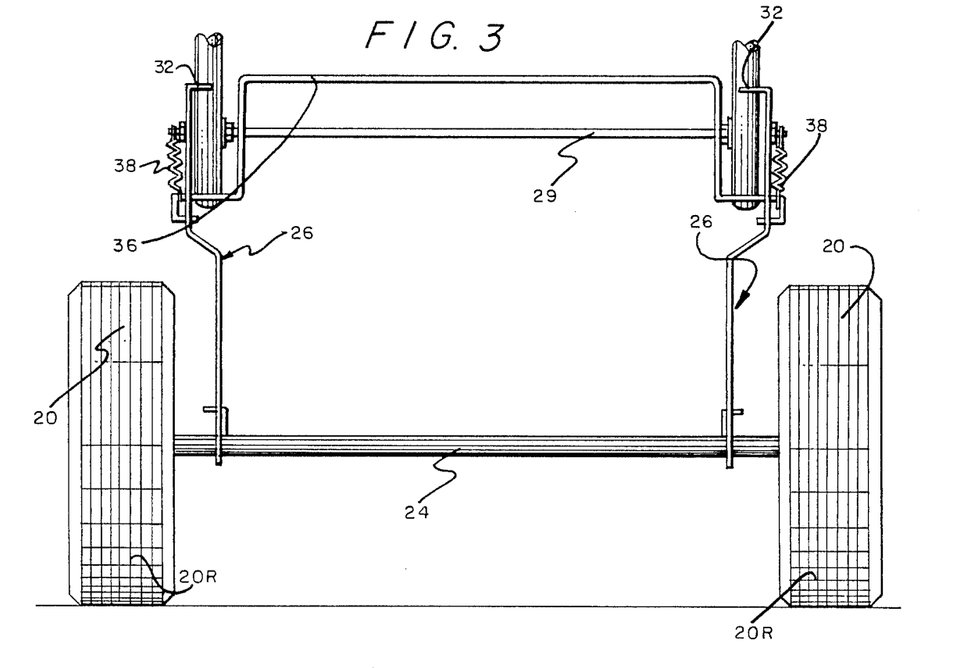
FIG. 3 is a partial rear elevational view of the motor cart disclosing the handle latch, the handle, the bracket-stop, the handle latch spring, and the rear axle which is supported by the rear wheel.
Figure 4:
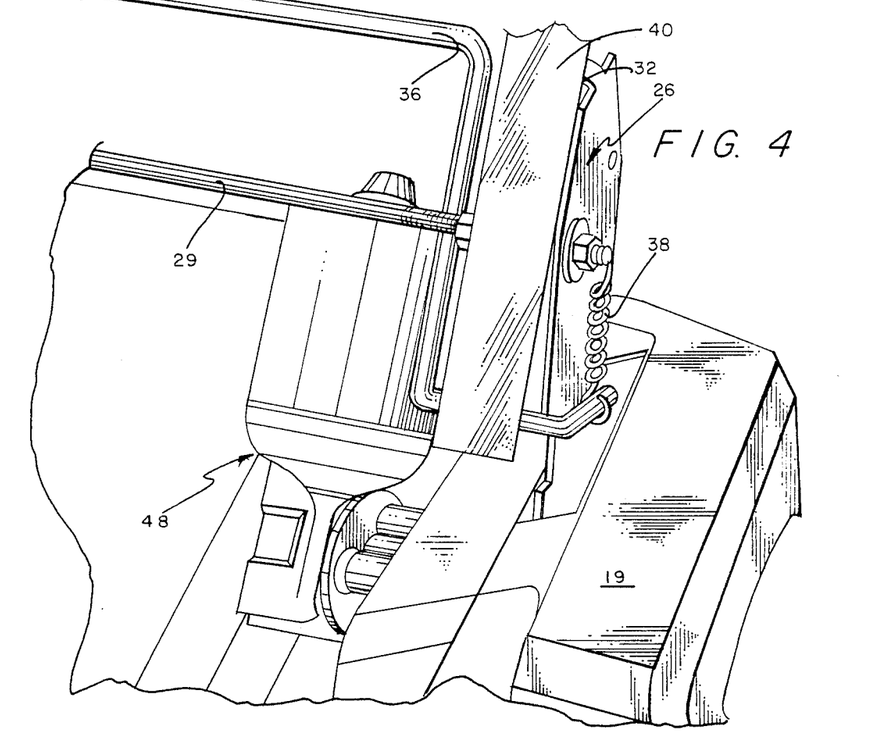
FIG. 4 is a partial perspective view of an end of the motor cart disclosing the handle latch, the handle support bar for the handle to pivot on, one of the pair of motors, and the bracket-stop and spring.
Figures 5, 6:
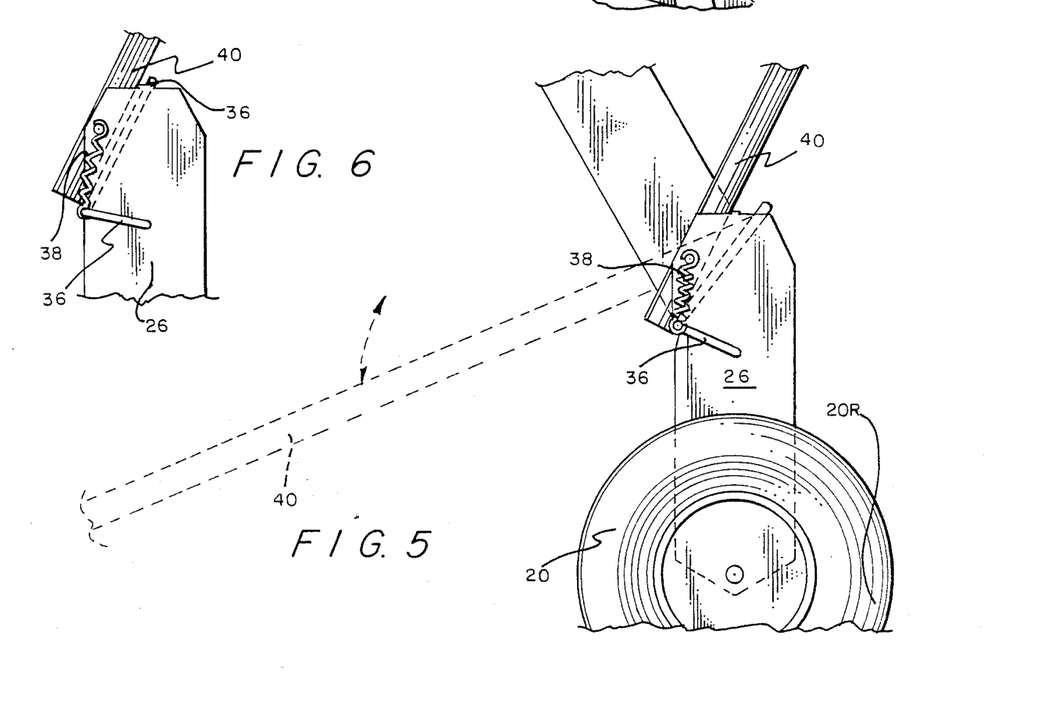
FIG. 5 is a partial side elevational view disclosing the handle in an upright position with solid lines, and the handle in a folded position with dotted lines.
FIG. 6 is a partial side elevational view disclosing the handle latch pushed forward in the direction of the arrow in order to allow the handle to swing past the handle latch in order to be placed in the folded position.
Figure 7:
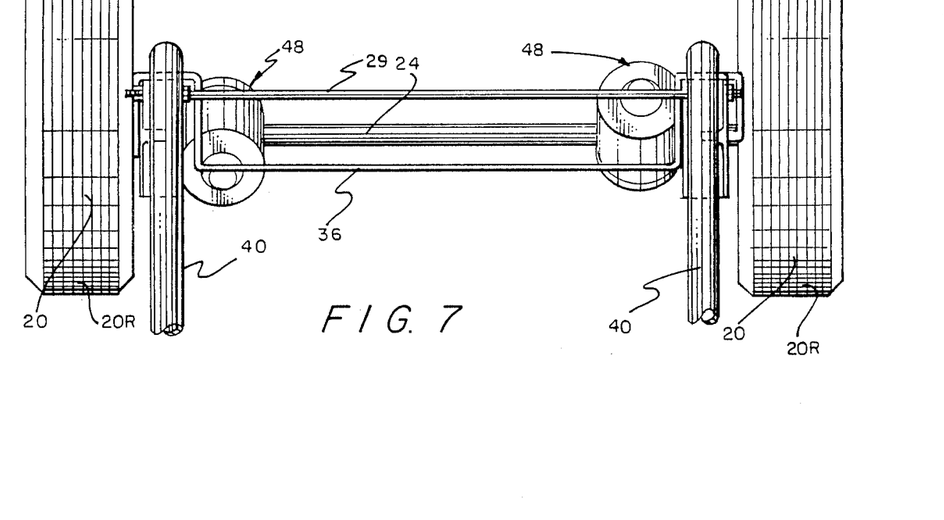
FIG. 7 is another top plan view of the motor cart disclosing a pair of motors, the handle latch, and the rear axle for supporting the pair of rear wheels.
Figure 8:
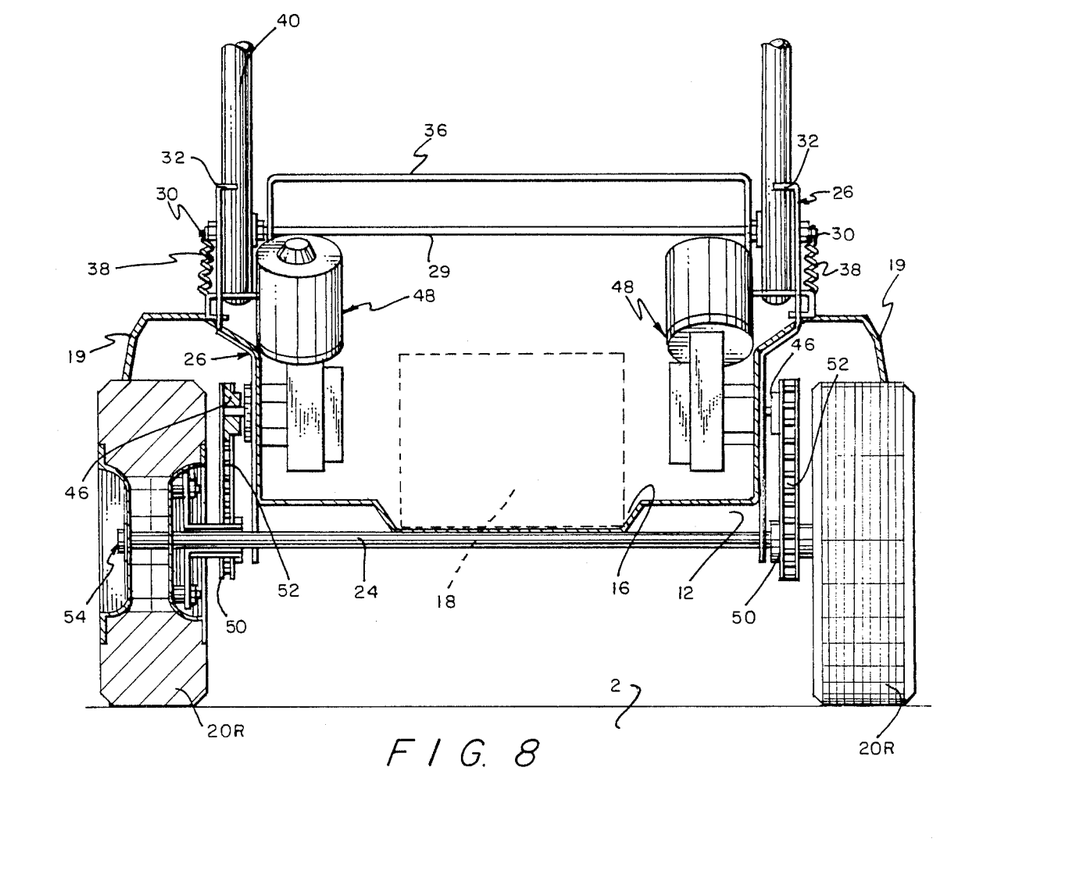
FIG. 8 is a partial back view disclosing not only the handle latch and handle support bar but also the pair of motors, the chain and sprockets and the pair of rear wheels supported by the rear axle.

The circuitry diagram for the present invention is generally illustrated as 98 and controls the speed and direction of the cart 10.

A source of power for the cart 10 and said electronic circuit 98 is provided by the battery 18 which consists of two conventional twelve-volt lead-acid batteries connected in series to provide a total of twenty-four volts. Other types of power and battery values could also be used within the spirit and scope of the invention.

The output voltage for the battery 18 is routed through a fuse 102 which prevents an overload and subsequent destruction of the electronic circuit 98 in case of a malfunction of one or more circuit components. The power from the battery 18 is then routed through an on-off switch 103. With the switch 103 in the "Off" position, no power will be provided to the circuit components, but with the switch 103 in an On position, power will be provided to all circuit components in the electronic circuit 98.

The twenty-four volts from the battery 18 is also routed to an Integrated Circuit Voltage Regulator 104. The Integrated Circuit 104 reduces the twenty-four volts from the battery 18 to twelve volts for use by various components within the electronic circuit 98.

The twenty-four volts from the battery 18 is routed to motors 48—48 through switch 140 and switch 150 respectively and the twenty-four volts is also routed to zener diode 105 and the zener diode 106.

Integrated circuit 116 is connected in such a manner that when power is applied, there will be a square wave generated at pin #6 within the Integrated Circuit 116. A triangle wave will also be generated at pin #6 of Integrated Circuit 121. Integrated circuit 121 is wired as an Integrator and the output is fed back to the integrated circuit 116 which compares the triangle wave from pin #6 of the integrated circuit 121 with the reference voltage at pin #2 of the integrated circuit 116. When the reference voltage, which is provided by resistor 123 and resistor 124, is greater than the value of the triangle wave provided at pin #6 of the Integrated circuit 116, the output is low at pin #6 of the integrated circuit 116. Whenever said triangle wave amplitude is greater than the reference voltage, the output at pin #6 of said integrated circuit 116 goes high and this high and low condition creates a square wave output.

The period of oscillation of said square wave is determined by the capacitor 120 connected to pin #6 and pin #2 of the integrated circuit 121. The ratio of resistor 118 to resistor 117 determines the amplitude of said triangle wave generated at pin #6 of the integrated circuit 121. The output of said integrated circuit 121 at the pin #6 is routed to integrated circuit 128 through a limiting resistor 122.

Connected to pin #3 of said integrated circuit 120 are variable resistors 125, 126 and 129. The variable resistors 125, 126 and 127 are used to provide a positive voltage at pin #3 of the integrated circuit 128. The value of the voltage provided at pin #3 by the resistor 126 determines the output pulse at pin #6 of the integrated circuit 128.

The output pulse at pin #6 of the integrated circuit 128 is low whenever the triangle wave fed to pin #2 of the integrated circuit 128 is greater in value than the reference voltage provided at pin #3. If the triangle wave value is less than said reference voltage, then the voltage at pin #6 of the integrated circuit 128 is a positive value which permits the motors 48—48 to be energised when desired.

By setting or adjusting the reference voltage, various duty cycles or ratios of on to off times can be sent to the motors 48—48. A duty cycle close to 100% occurs when the pulse is a constant high which will cause the motors 48—48 to run at maximum speed when energized. A lower duty cycle is also possible and the motors 48—48 will run at a speed which is proportional to the duty cycle which is determined by the reference voltage provided at pin #3 of the integrated circuit 128.

The output of the integrated circuit 128 is fed to transistor 131 through resistor 129. The transistor 131 is a standard commercially available darlington transistor with its Collector 130 wired to the positive 12-volt supply. Its emitter 132 is connected to the resistor 133. The resistor 133 is a current limiting resistor which is connected to a Resistor 134 and to a power transistor 41. The resistor 134 is used to insure that when no positive pulse is sent to the base of the transistor 141, that the transistor 141 will be in an off condition. The collector 135 of the transistor 141 and transistor 137 are connected together so each can provide current for the motor 48 when activated by the switch 140. Also connected to said Collector 135 is Diode 138 which is used to prevent feedback voltage from destroying the transistor 137 and the transistor 141 when the motor 48 shuts off and its magnetic field collapses.

Connected to the collector 135 of the transistor 137 and the transistor 141 is the switch 140 which is a double-pole double-throw Switch with a spring return center-off position. Normal position is off which means that the transistor 137 and the transistor 141 cannot be connected to the motor 48 and the positive voltage supply. Therefore, the unit is in an off state. When the switch 140 is placed in a forward position, then the 24-volt positive supply voltage is connected to the motor 48 and the opposite side of the motor 48 is connected to said collectors of the transistor 137 and transistor 141. With this connection completed, current can flow and the motor 48 will run.

If the switch 140 is placed in a reverse position, then the collector 135 will be connected to the positive side of the motor 48 and the positive voltage supply will be connected to the negative side of the motor 48 and the permanent magnet type of motor will run in reverse.

The emitter 132 of the transistor 131 is also connected to the resistor 142. The resistor 142 is a current limiting resistor which is connected to a resistor 143 and to a power transistor 144. The resistor 143 is used to insure that when no positive pulse is sent to the base of the transistor 144, and that the transistor 144 will be in an off condition. The collector 145 of the transistor 144 and transistor 147 are connected together so each can provide current for the motor 48 when activated by the switch 150. Also, connected to the collector 145 is diode 148 which is used to prevent feedback voltage from destroying the transistor 144 and the transistor 147 when the motor 48 shuts off and its magnetic field collapses.

Connected to the collector 145 of the transistor 144 and the transistor 147 is switch 150 which is a Double-pole Double-Throw Switch with a spring return center-off position. Normal position is off which means that the transistor 144 and the transistor 147 cannot be connected to the motor 48 and the positive voltage supply, therefore, the unit is in an off state. When the switch 150 is placed in a forward position, the 24-volt positive supply voltage is connected to the motor 48 and the opposite side of the motor 48 is connected to the collectors of the transistor 144 and the transistor 147. With this connection completed, current can flow and the motor will run.

If the switch 150 is placed in a reverse position, then the collector 145 will be connected to the positive side of the motor 48 and the positive voltage supply will be connected to the negative side of said motor 48 and the permanent magnet type of motor will run in reverse.

If only one motor is permitted to run at a time, then the direction of the cart 10 will be determined by which motor is permitted to run.

With one motor 48 running and the other motor 48 placed in a reverse mode, a much sharper turn can be accomplished than would otherwise be possible if only one motor was permitted to run. When both motors 48—48 are running a forward or reverse motion can be accomplished depending on the position of the switches 140 and 150.

Since the switch 140 and the switch 150 have a spring return center-off position, the motors 48—48 will stop whenever the forward or reverse pressure is removed from the switches 140 and 150.

Transistor 108 and transistor 114 are used to warn the operator when the battery 18 needs to be recharged. Normal operation is such that when the battery 18 is fully charged, there is sufficient voltage to overcome the breakdown voltage of said zener diode 105 and zener diode 106 which are connected together in such manner that they represent a total breakdown voltage of approximately 19.5 volts. Other voltage values can be established by using different values for the zener diode 105 and the zener diode 106. When the voltage from the battery 18 is greater than the value of the zener diode 105 and the zener diode 106, current will flow through the 10K ohm limiting resistor 107 connected to the base of the transistor 108 which makes the transistor 108 conduct which permits current to flow from the positive voltage supply through the resistor 109 through the transistor 108 to ground through emitter 115 of the transistor 108. When this condition exists, there can be no output voltage at junction 110 which means there is no base current for the transistor 114 and with the transistor 114 in the off condition, there can be no current flowing through the resistor 112 or the light emitting diode 113 and with the light emitting diode 113 extinguished, it indicates a suitable battery 18 condition.

When the voltage from battery 18 drops below the threshold voltage of the zener diode 105 and zener diode 106 then they will no longer conduct and there will be no base current for the transistor 108 and the transistor 108 will be turned off. When transistor 108 is turned off, current will be permitted to flow through the resistor 109 and then through the limiting resistor 111 connected to the base of the transistor 114. With this current flowing, the transistor 114 will permit current to flow through the resistor 112 and the light emitting diode 113 connected to the collector of the transistor 114 and the light emitting diode 113 will light indicating that the battery 18 needs to be recharged. The resistor 112 is a limiting resistor which prevents excessive currents from destroying the diode 113 when the transistor 114 is turned on.

The motors 48—48 are 24-volt direct-current motors with a 0.250 horsepower rating and with standard commercially available gear drives attached. Other motor sizes and configurations with different values will also permit efficient operation of the cart 10.

While the value for the electrical components in the drawings may be of any suitable value(s) for circuitry to function in operating the drive motors 48—48 for propelling the cart 10 of this invention, preferred values for each of the electrical components are as follows: integrated circuits 116, 121, 128: 741; integrated circuit 104: 278, 12; resistor 117: 22K ohms; resistor 118: 10K ohms; resistor 119: 100K ohms; resistor 122: 10K ohms; resistor 123: 10K ohms; resistor 124: 10K ohms; variable resistors 125, 126 and 127: 13.3K ohms, 5K ohms, and 17-1K ohms, respectively; resistor 129: 1K ohms; transistor 131: TIP 120; resistor 142: 200 ohms; resistor 143: 2K ohms; transistor 144: 2N3055; transistor 147: 2N5301; diode 148: IN5402; resistor 133: 200 ohms; resistor 134: 2K ohms; transistor 141: 2N3055; transistor 137: 2N5301; diode 138: IN5402; diode 105: 7.5 zener; diode 106: 12 V zener; resistor 107: 10K ohms; transistor 115: 2N2222; resistor 109: 10K ohms; resistor 111: 1K ohms; transistor 114: 2N2222; diode 113: light emitting diode (LED).

While the present invention has been described herein with reference to particular embodiments thereof, a latitude of modification, various changes and substitutions are intended in the foregoing disclosure and it will be appreciated that in some instances some features of the invention will be employed without a corresponding use of other features without departing from the scope of the invention as set forth.

What is claimed is:

1. A motorized carrying cart comprising:
    a pan bracket means having a structure defining a lateral slot, a battery recess, a pair of fenders with each fender having a fender slot;
    a pair of front wheels and a pair of rear wheels supporting the pan bracket;
    a battery positioned in said battery recess to be supported by the pan bracket;
    a pair of upright bracket means secured to said pan bracket means, each of said upright bracket means has a structure defining a first aperture, a second aperture, a plurality of third apertures with the majority of said third apertures being substantially oblong in shape and not circular, and a fourth aperture, each of said upright bracket means being structurally deformed such as to define a stop means;
    a handle support bar with a pair of support ends extending through and protruding from said first apertures of said upright bracket means;
    a handle latch means whose uppermost portion is generally horizontal with a horizontal plane and whose end sections are deformed such that each end section extends downwardly from the horizontal uppermost portions, then horizontally over to and past one of said upright bracket means and across the outside facial surface of said one of said upright bracket means and subsequently extending normally with respect to the plane of said one of the upright bracket means through said second aperture of said one of the upright bracket means such that said handle latch means has an end pivotally secured to one of said pair of upright bracket means;

a pair of spring means extending from the support ends of said handle support bar to the end sections of said handle latch means that extend across the outside facial surface of said upright bracket means for biasing the handle latch means upwardly towards the handle support bar;

a pair of motor drive means mounted to the pair of upright bracket means through said plurality of third apertures;

an axle extending laterally across the motorized carrying cart with its ends extending through the fourth aperture of said upright bracket means with said rear wheels rotatably secured to the ends of the axle;

a pair of upper sprocket means directly engaged to the pair of motor means on the opposite side of said upright bracket means where said motor drive means mount to said upright bracket means through said third apertures;

a pair of lower sprocket means secured to the axle between the upright bracket means and the rear wheels;

a pair of endless chains engaging the upper sprocket means and the lower sprocket means; and a generally U-shaped handle means having end sections that are pivotally secured to said handle support bar such that the end sections of the U-shaped handle rests on the end sections of the handle latch means to be biased upwardly while the respective stop means on the pair of upright bracket means engages a section of handle means above the handle support bar to prevent the handle from rotating past the stop means on each of the bracket means.

2. The motorized carrying cart of claim 1 additionally comprising a reinforcement bracket means secured to underneath the front side of said pan bracket means, and said pair of front wheel means being connected to said reinforcement bracket means.

3. The motorized carrying cart of claim 1 additionally comprising a circuitry means electrically engaged between said battery and each of said drive motor means for conducting power from the battery to the drive motor means.

4. The motorized carrying cart of claim 3 additionally comprising a cover means having a structure defining a pair of cover apertures wherethrough the U-shaped handle slidably passes, and said cover means having a front portion slidably engaged within said lateral slot of said pan bracket and a rear portion slidably engaged within said pair of fender slots.

5. A motorized carrying cart comprising:
a pan bracket means;
a pair of front wheels and a pair of rear wheels supporting the pan bracket means;
a battery supported by the pan bracket means;
a pair of upright bracket means secured to said pan bracket means;
a handle support bar with a pair of support ends, with one support end extending through said protruding from one of said pair of upright bracket means and the other support end extending through and protruding from the other of said pair of upright bracket means;
a handle latch means terminating in a pair of end sections that are pivotally secured to said pair of bracket means;
a pair of spring means extending from said handle support bar to the end sections of said handle latch means for biasing the handle latch means upwardly towards the handle support bar;

a pair of motor drive means mounted to the pair of upright bracket means;

an axle extending laterally across the motorized carrying cart and extending through said pair of bracket means with said rear wheels rotatably secured to the ends of the axle;

a pair of upper sprocket means directly engaged to the pair of motor means on the opposite side of said upright bracket means where said motor drive means are mounted to the upright bracket means;

a pair of lower sprocket means secured to the axle;

a pair of endless chains engaging the upper sprocket means and the lower sprocket means; and a generally U-shaped handle means whose end sections are pivotally secured to said handle support bar.

6. The motorized carrying cart of claim 5 wherein one of said pair of lower sprocket means is secured to the axle between one of said pair of bracket means and one of said pair of rear wheels.

7. The motorized carrying cart of claim 5 wherein said end sections of said handle means are pivotally secured to said handle support bar such that the end sections of the U-shaped handle rest on the end sections of the handle latch means to be biased upwardly while the respective stop means on the pair of bracket means engages a section of handle means above the handle support bar to prevent the handle from rotating past the stop means on each of the bracket means.

8. The motorized carrying cart of claim 5 wherein said pan bracket means has a structure defining a lateral slot, a battery recess and a pair of fenders with each fender having a fender slot.

9. The motorized carrying cart of claim 8 wherein said battery is positioned in said battery recess.

10. The motorized carrying cart of claim 5 wherein each of said upright bracket means has a structure defining a first aperture, a second aperture, a plurality of third apertures with the majority of said third apertures being substantially oblong in shape and not circular, and a fourth aperture, each of said upright bracket means being structurally deformed such as to define a stop means.

11. The motorized carrying cart of claim 10 wherein said handle latch means has an uppermost portion that is generally horizontal with a horizontal plane and whose end sections are deformed such that each end section extends downwardly from the horizontal uppermost portions, then horizontally over to and past one of said upright bracket means and across the outside facial surface of said one of said upright bracket means and subsequently extending normally with respect to the plane of said one of the upright bracket means through said second aperture of said one of the upright bracket means such that said handle latch means has an end pivotally secured to one of said pair of upright bracket means.

12. The motorized carrying cart of claim 10 wherein one of said support ends of said handle support bar extends through and protrudes from said first aperture of one of said bracket means.

13. A motorized carrying cart of claim 11 wherein one of said pair of spring means extends from one of the ends of said handle support bar to one of the end sections of said handle latch means that extends across the outside facial surface of one of said bracket means.

14. The motorized carrying cart of claim 10 wherein one of said pair of motor drive drive means is mounted to one of the pair of bracket means through said third aperture.

15. The motorized carrying cart of claim 10 wherein one of the ends of the axle extends through the fourth aperture of one of the pair of bracket means.

* * * * *